United States Patent [19]
Piasecki

[11] Patent Number: 6,065,718
[45] Date of Patent: May 23, 2000

[54] UNIVERSAL VTOL POWER AND ROTOR SYSTEM MODULE

[76] Inventor: Michael W. Piasecki, Tunbridge Rd., Haverford, Pa. 19041

[21] Appl. No.: 09/045,991

[22] Filed: Mar. 23, 1998

[51] Int. Cl.[7] .................................................. B64C 27/04
[52] U.S. Cl. ..................................... 244/17.11; 244/17.19; 244/17.23; 244/17.21
[58] Field of Search ............................. 244/17.11, 17.19, 244/17.21, 17.23

[56] References Cited

U.S. PATENT DOCUMENTS

| | | | |
|---|---|---|---|
| 1,353,692 | 9/1920 | Wolfe et al. | 244/17.21 |
| 2,552,864 | 5/1951 | Piasecki et al. | 244/17.23 |
| 2,973,923 | 3/1961 | Sznycer | 244/17.11 |
| 3,029,048 | 4/1962 | Brooks et al. | 244/17.19 |
| 3,807,662 | 4/1974 | Velazquez | 244/17.21 |
| 3,921,939 | 11/1975 | Garfinkle | 244/17.11 |
| 5,609,312 | 3/1997 | Arlton et al. | 244/17.11 |

FOREIGN PATENT DOCUMENTS

| | | | |
|---|---|---|---|
| 921723 | 5/1947 | France | 244/17.11 |

*Primary Examiner*—Peter M. Poon
*Assistant Examiner*—Tren Dinh
*Attorney, Agent, or Firm*—David A. Sasso

[57] ABSTRACT

A universal power drive and lifting rotor system module adaptable for powering various types of single and multiple rotor VTOL aircraft comprising an elongated component support framework on the top of which a lifting rotor assembly and transmission are mounted onto the front end of which an engine is externally supported and the rear end of which is adapted for attachment and external support of a VTOL augmentation framework carrying a lifting rotor torque compensating unit. The rotor assembly and transmission receive power from a power train comprising a main drive shaft coupled to the engine and supported for rotation within the component support framework to extend longitudinally thereof and connected through a pulley and belt rotational power arrangement to the rotor transmission power input shaft extending from within the transmission to above the rear end of the component support framework. The outer free ends of the main power and transmission power input shafts have a coupling attachable to a rotatable shaft powering a rotor torque compensating unit carried on any one of a variety of VTOL augmentation auxiliary framework assemblies configured to be attachable to the rear end of the module component support framework. The attachable auxiliary framework assemblies include a framework on which is mounted a vertically rotating torque compensating tail rotor, a wing attached compound VTOL augmentation framework having a ducted propeller ahead of a slip stream deflecting tail assembly and a framework connecting a pair of back-to-back oriented modules comprising a dual rotor tandem VTOL.

8 Claims, 4 Drawing Sheets

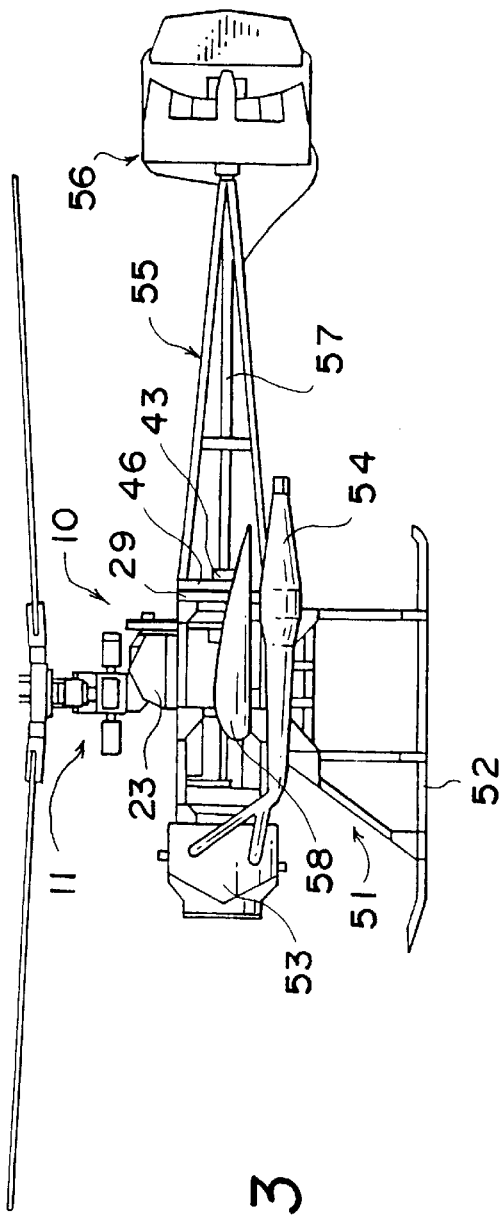
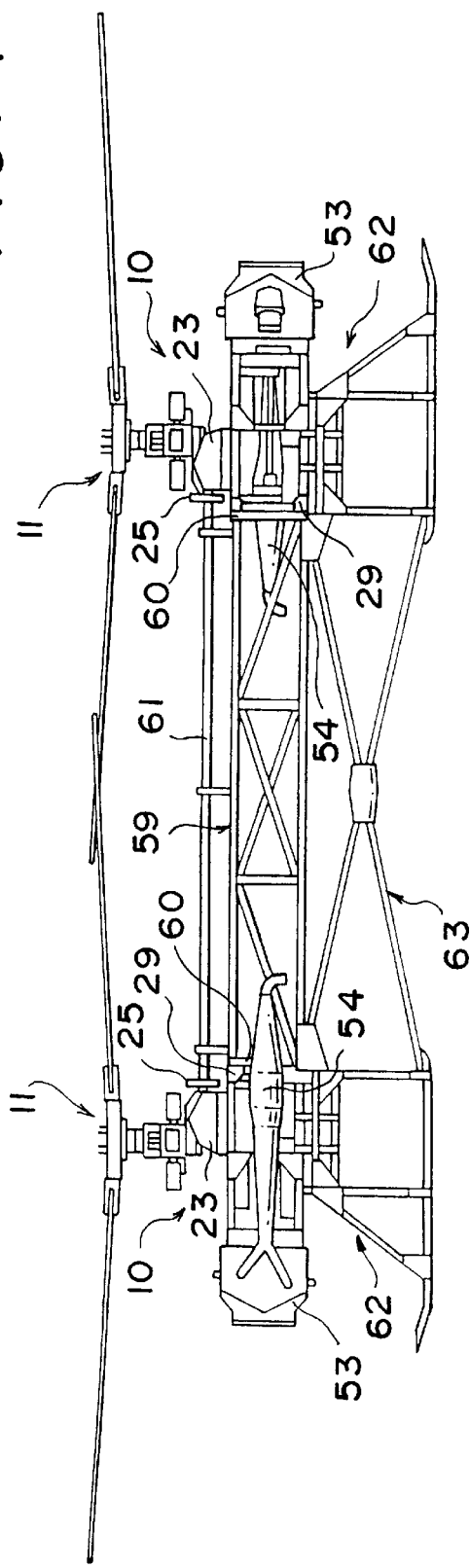

UNIVERSAL VTOL POWER AND ROTOR SYSTEM MODULE

BACKGROUND OF THE INVENTION

This invention broadly relates to aerial vehicles having vertical takeoff/landing capability (VTOL), of which helicopters are a common type, and of which the described VTOL aircraft has a particularly useful capability as an unmanned aerial vehicle (UAV), sometimes referred to as a "drone" aircraft.

More particularly, the broad novel aspect of the invention is a common universal power drive and lifting rotor system module from which various types of single and multiple rotor VTOL aircraft can be produced by attaching appropriate rotor torque counteracting structures. The simplicity and versatility of the power drive and lifting rotor system module of the invention is such that it has a particular adaptation to providing VTOL UAV aircraft of several types that are highly suitable to carrying out military and commercial surveillance missions.

There is a particular need for a portable, remotely controlled VTOL UAV platform carrying visual and sensing recording devices for performing a variety of military and commercial missions involving currently transmitting or recording visual and other ground data information that is not readily available or possible by other means. The capability of recently developed, simple and lightweight devices for recording and transmitting a wide variety of visual and other data is such that their usefulness can be greatly expanded by mounting them on a portable and remotely controlled VTOL UAV aircraft platform. Typical missions for such VTOL UAV units would be aerial intelligence gathering and reconnaissance, commercial cinematography, news coverage, aerial mapping, law enforcement and anti-terrorism augmentation, border patrol, disaster assessment, environmental assessment, utility inspection and maintenance, etc.

SUMMARY OF THE INVENTION

An object of the invention is to provide a universal power drive and lifting rotor system unit or module suitable for powering a variety of types of VTOL aircraft.

Another object of the invention is to provide a universal power drive and lifting rotor system module suitable for powering both single and multiple rotor type VTOL aircraft.

A further object of the invention is to provide a universal power drive and rotor system suitable for powering both single rotor convention and compound helicopters.

Yet still a further object of the invention is to develop a universal power drive and lifting rotor system module for powering single and multiple Rotor VTOL UAV aircraft of various types.

These objects have been achieved by incorporating VTOL power producing and lifting rotor systems and their interconnections on and within an elongated tubular component supporting framework on the front end of which an externally mounted engine is supported and of which the rear end of the main component supporting framework is configured for the attachment of an externally supported auxiliary VTOL augmentation framework carrying counter thrust means for counteracting torque of the module rotor suitable for the type of VTOL aircraft being powered by the module. The lifting rotor assembly and transmission powered by the module are mounted atop the module component support framework and receive power from a power train comprising a main drive shaft coupled to the engine and extending within and longitudinally of the length of the component support framework. The main drive shaft is connected through a clutch and a pulley and belt rotational power transfer arrangement to the rotor transmission power input shaft that extends from within the transmission to an outer end adjacently above the rear end of the component support frame. The outer ends of the main drive and transmission power input shafts are fitted with a coupling suitable for connecting to a drive shaft of the particular rotor torque compensating means mounted on any one of the VTOL conversion auxiliary frameworks affixed to the rear end of the module component support framework. Thus, a variety of types of VTOL aircraft can be powered by attaching the versatile power drive and rotor system module to an auxiliary framework on which is mounted the particular type of rotor torque compensating system utilized on the specific type of VTOL being produced.

BRIEF DESCRIPTION OF THE DRAWINGS

FIG. 3 is a side elevation of a single rotor VTOL compound aircraft powered by the power drive and lifting rotor system module of FIG. 1.

FIG. 4 is a side elevation of a dual rotor VTOL aircraft powered by the power drive and lifting rotor system module of FIG. 1.

DETAILED DESCRIPTION OF THE INVENTION

Figure 1:
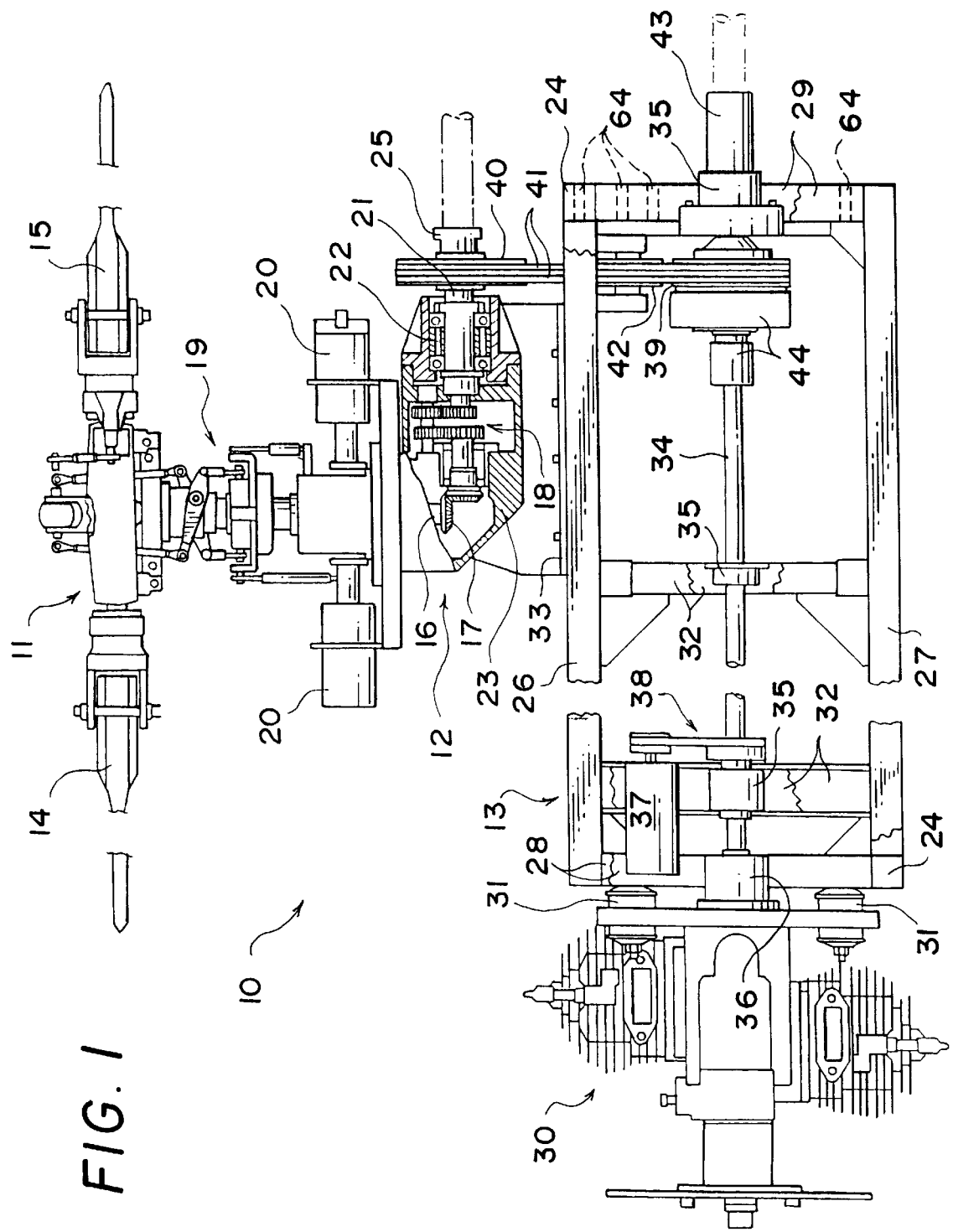
FIG. 1 is a side elevation partly in section of the universal power drive and lifting rotor system module.

The module 10 utilized to power various types of VTOL aircraft subsequently described is illustrated in FIG. 1, in which a conventional lifting rotor assembly 11 and underlying transmission 12 are mounted onto the top of an elongated tubular component support framework 13 on which the operative components of the module are supported. The rotor assembly 11 is of conventional nature with a pair of rotor blades 14, 15 hingably supported at the top of a vertically extending rotor shaft 16 of which the lower end contains a beveled gear 17 meshing with a reduction gear train 18 contained in the rotor transmission 11. The rotor assembly 10 is conventional in nature with the pitch of the rotor blades 14, 15 being controlled collectively and cyclically by the linkage arrangement of a conventional type swash plate assembly 19 actuated by servo motors 20 and of which the details will not be described as being well known in the art and not constituting a part of the invention. The transmission gear train 18 is driven by a power input shaft 21 supported by bearing 22 in the transmission housing 23 and extends from within the transmission housing 23 to an outer end 24 fitted with a coupling 25 suitable for receiving an external rotatable shaft. The component supporting framework 13 of the module on which the lifting rotor assembly 11 and underlying transmission 12 and other components of the module are supported preferably is an elongated open framework of box girder construction of which the illustrated configuration comprises upper 26 and lower 27 longerons extending longitudinally each side of the component support framework 13 with vertically extending frames 28 joining the upper and lower longerons 26, 27 at the front end of the framework 13 on which an engine 30 is supported from flexible engine mounts 31 mounted on the front end frames 28. Vertically extending frames 29 join the upper ends of longerons 26, 27 at the rear end of the framework 13, midframes 32 extend vertically between the upper and lower longerons 26 at intermediate points along their length and horizontally extending end frames 24 join the junctures of the front end vertical frames 29 and rear end vertical frames 28 with the upper and lower longerons 26, 27 at both ends of the component support framework. Rear end frames 29 and other portions of the rear portion of the support framework 13 are provided with bolt holes 64 and other facilities for attaching the end frames of VTOL augmentation auxiliary framework. The rotor assembly 11 and underlying transmission 12 are supported by a base plate 33 on the lower side of the transmission housing 23 that extends between the upper longerons 26 each side of the component support framework 13. The illustrated open type structure of the component support framework 13 provides space in which the various control and operational components required for operation of a VTOL may be stowed, these components being conventional and well known in the VTOL and VTOL UAV art, and not being a part of the invention, are not described or illustrated.

A main power drive shaft 34 extending longitudinally of the component support framework 13 is supported for rotation by bearings 35 in the framework structure with the front end of the drive shaft 34 operatively connected to the engine 30 by a coupling 36, preferably a flexible coupling that de-links axially. A preferred powering unit mounted on the front of the component support framework 13 is a two-stroke air cooled engine with twin opposed cylinders, but other engines suitable for mounting on the front end of the support framework 13 could be utilized, preference for a two-stroke engine being subsequently discussed with respect to the module being used to power a dual rotor configured VTOL aircraft. Auxiliary power for the module is conveniently supplied from a generator 37 mounted on a forwardly located vertically extending intermediate frame member 32 and driven from the main drive shaft 34 by a pulley and belt arrangement 38. Rotational power of the main drive shaft 34 is transferred to the transmission power input shaft 21 by means of a pulley and belt drive comprising a pulley 39 mounted on the main drive shaft 34 and a pulley 40 mounted on the transmission input shaft 21 with a pair of endless belts 41 connecting the two pulleys, the belts 31 being mounted on a tensioner idler pulley 42 to prevent belt slippage. Although gear trains and other well known power transfer means could be utilized as a power transmission means, the described pulley-belt drive arrangement is one preferred embodiment as being light and effective. The free outer end portion of the main drive shaft 34 in the region of the rear end vertical frame 29 is fitted with a coupling 43 suitable for connection to an external rotatable shaft of a VTOL augmentation auxiliary framework unit affixed to the outer end of the component support framework 13. A centrifugal clutch 44 is incorporated in the main drive shaft 34 adjacent the pulley 39 of the power transmission arrangement, operation of the clutch selectively connecting and disconnecting the portion of the main drive shaft 34 connected to the engine from the pulley and belt connection to the transmission power input shaft 21 and the free outer end portion of the main drive shaft 34 containing the exterior drive shaft coupling 43.

Figure 2:
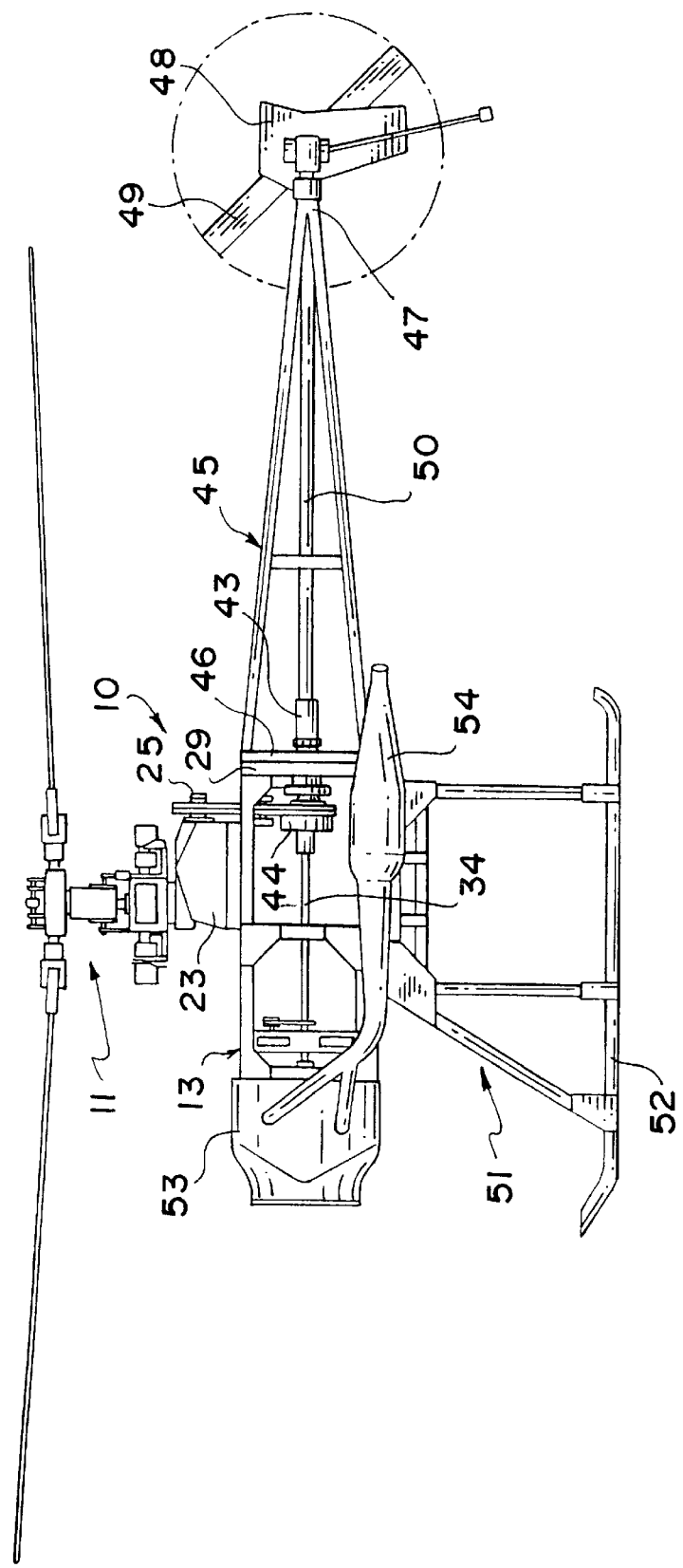
FIG. 2 is a side elevation of a single rotor VTOL aircraft powered by the power drive and lifting rotor system module of FIG. 1.

The versatility of the above described module 10 for powering a variety of types of VTOL aircraft, particularly VTOL UAV aircraft (drone helicopters) is demonstrated in the following descriptive matter relating to the illustrations of FIGS. 2, 3 and 4. FIG. 2 illustrates the module of the invention powering a widely utilized type of VTOL aircraft having a tail mounted torque compensating rotor. Referring now to FIG. 2, an elongated VTOL augmentation framework 45 having a front end cross-sectional configuration of frame members 46 conforming to that of the module component supporting framework rear end members 24, 29 is attached to the rear of the module component supporting framework 13 by bolts or other attaching components previously described, the rear end 47 of the augmentation framework containing a vertical stabilizer 48 and a torque compensating rotor 49 mounted for rotation in a vertical plane. A rotor drive shaft 50 supported for rotation within the auxiliary framework 45 is operatively connected at one end to rotate the tail rotor 49 and connected at the other end to the module main drive shaft 34 through the coupling 43. An undercarriage 51 configured with a landing support 52 is affixed to the module framework lower longerons 27. The undercarriage illustrated is one suitable for a VTOL UAV type aircraft. Obviously, if the module is of a size and power suitable for powering pilot controlled aircraft, the undercarriage structure and configuration would conform more closely to a conventional VTOL fuselage. The module illustrated in FIG. 2, as well as FIGS. 3 and 4, includes an engine shroud 53 and exhaust system 54 which are appurtenances to a normal engine installation and are not illustrated in FIG. 1 for purposes of clarity and simplicity.

FIG. 3 illustrates another variation of a single rotor type VTOL aircraft powered by the module of the invention, a compound VTOL aircraft in which an elongated auxiliary framework 55 having a front end cross-sectional configuration of frame members 46 conforming to and attached to the module component support framework rear members 24, 29 incorporates a shrouded propeller and propeller slip stream deflecting assembly 56 on the rear end of the framework 55 basically conforming to the type of tail assembly of a compound helicopter described in U.S. Pat. No. 4,905,932 incorporated herein for purposes of understanding the nature and operation of the tail assembly. The tail assembly 56, more fully described in the incorporated patent, comprises a longitudinally extending annular duct within which a variable pitch propeller is concentrically contained for rotation forwardly of movable vanes mounted to deflect the propeller slip stream selective degrees transversely of the duct. As more fully described in the incorporated patent, the slip stream of the shrouded propeller functions to both provide a rotor torque countering moment when deflected or provide for propulsion of the aircraft when the slip stream is undeflected and the lifting rotor unloaded. A propeller drive shaft 57 supported for rotation within the auxiliary framework 55 connects at one end to the propeller of the shrouded propeller tail assembly 56 and at the other end to the module drive shaft 34 through the coupling 43. Wings 58 are affixed to opposite sides of the module component support framework 13 to extend outwardly on each side in the same manner as indicated in the wing structure described for the compound VTOL aircraft of the patent incorporated herein. As indicated with reference to the embodiment of FIG. 2, an undercarriage 51 with ground support provisions 52 is affixed to the module lower longerons 27. Such an arrangement would be suitable for a VTOL UAV aircraft, but would take the form of a more conventional fuselage if the module powers a passenger-carrying VTOL aircraft.

A particularly useful VTOL configuration utilizing a pair of the modules of the invention for powering a twin rotor VTOL aircraft is illustrated in FIG. 4. By interconnecting a pair of modules of the invention in a back-to-back arrangement, the payload is considerably more than can be carried by a single module configuration, the lifting rotor torque generated by one module being counteracted by the other module. Referring now to FIG. 4, an elongated truss framework 59 is configured such that the cross-sectional configuration of each of the end frame members 60 conforms to that of the module component support framework rear members 24, 29. The end frame members 60 at the respective ends of the truss framework 59 are affixed to the rear end members 24, 29 of the respective modules 10 with the modules in a back-to-back relationship. A connecting shaft 61 rotatably supported by and above the truss framework 58 has its respective ends connected to the transmission input shafts 21 of the respective modules 10 through their respective transmission power input shaft couplings 25. An undercarriage and ground support structure 62 is attached to the lower longerons 27 of the respective modules 10, along with suitable supplemental module connecting structure 63.

Figure 5:
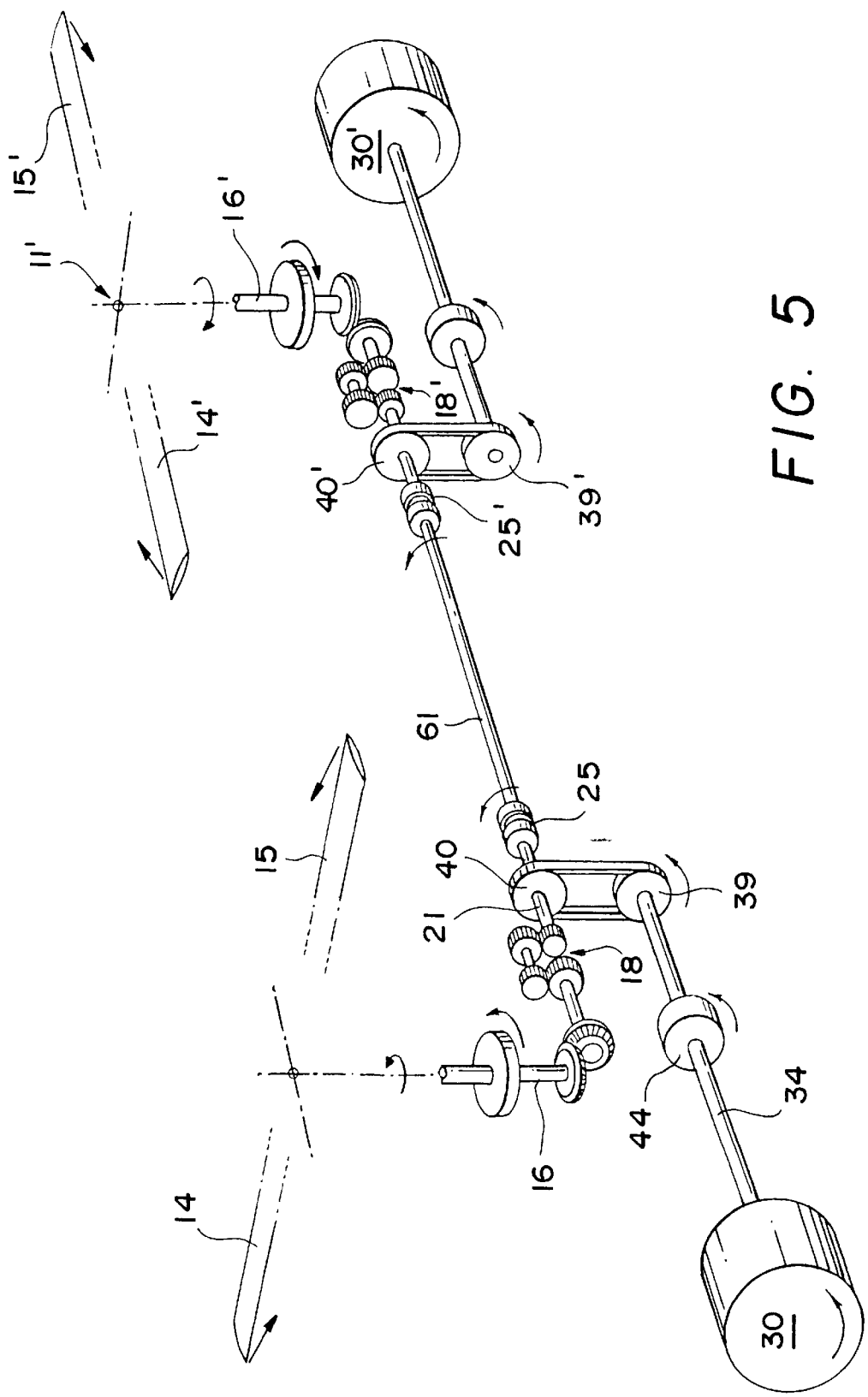
FIG. 5 is a perspective schematic illustration of the power drive shaft arrangement of the dual rotor VTOL aircraft of FIG. 4.

The tandem rotor configuration of the VTOL aircraft of FIG. 4 requires the lifting rotors 11 of the respective back-to-back arranged modules 10 rotate in opposite directions in connection with which FIG. 5 is included. This Figure schematically indicates the relationship of the drive shaft trains through which the rotors of the respective interconnected modules 10, 10' are driven. For simplicity of illustration, the corresponding components are identified by the same numeral, with the components of one module bearing a prime numeral. As is clearly evident from FIG. 5, to establish counter-rotation of the main lifting rotors 11, 11' of the respective back-to-back arranged modules 10, 10', the main drive shafts 34, 34' of the respective modules and the respective engines 30, 30' must rotate oppositely; e.g., the engine 30 of the left side module 10 rotates clockwise as viewed from the front side of the engine and the engine 30' of the right side module 10' rotates counterclockwise as viewed from the front side of the engine. For this reason, a two-stroke engine is the preferred embodiment as two-stroke engines have the characteristic of operating in either direction with no change to the timing or other operative components of the engine. A two-stroke engine operates in the same direction in which it is started. Hence, an operative configuration of the described tandem rotor VTOL aircraft of FIG. 4 powered by a pair of modules of the invention connected back to back in the manner described is easily achieved by starting the respective engines of the pair of modules in opposite directions, with the main drive shaft clutches 44 of the modules de-clutched. Four-stroke engines could be utilized, but would require a different timing adjustment of each of the respective engines and other modifications.

As previously indicated, the space provided within and on the module component support framework 13 is available for installation of components involving operative control of the module lifting rotor assembly 11 and operative control of VTOL augmentation auxiliary framework mounted flight control units. Although these components are necessary in an operative VTOL aircraft, being conventional items known in the art and not part of the present invention, they are not described or illustrated herein. The present invention being particularly adapted to powering VTOL UAV aircraft, the described VTOL embodiments of FIGS. 2, 3 and 4 are of this unmanned type and would require the installation of equipment which establishes remote control of the aircraft from the ground. Such equipment is well known, of which the disclosure in U.S. Pat. No. 3,096,046 is an example, and equivalent remote control devices not herein described, not being a part of the invention; conveniently are mounted on the component support framework 13 of the module or the VTOL augmentation framework of FIGS. 2, 3 and 4.

It should be understood that the foregoing disclosure involves typical embodiments of the invention and that numerous modifications or alterations therein may be made without departing from the spirit and scope of the invention as set forth in the appendant claims.

What is claimed is:

1. A universal power drive and lifting rotor system module for powering single and multiple rotor type VTOL aircraft comprising:

an elongated module component support framework having a plurality of engine mounts arranged at one end for externally supporting an engine thereon and other end adapted for connecting to auxiliary VTOL augmentation framework, said engine being supported on said engine mounts, a main drive shaft supported for axial rotation within said component support framework to extend longitudinally thereof between said component support framework respective ends, one end of said main drive shaft having coupling means for detachably connecting and disconnecting said main drive shaft and said engine, said main drive shaft other end being adapted for connection to a rotatable shaft, a lifting rotor assembly and underlying transmission mounted atop said component support framework, said rotor transmission having a power input shaft extending from within said transmission terminating in an outer end adjacent said component support framework other end with said power input shaft outer end adapted for connection to said rotatable shaft, power transfer means connected between said main drive shaft and said rotor transmission power input shaft for transferring rotational power between said main drive and said rotor transmission input shafts and clutch means contained in said main drive shaft adjacent said power transfer means connection for selectively connecting and disconnecting said main drive shaft and said power transfer means.

2. The module of claim 1 wherein said main drive shaft coupling means comprises flexible coupling means for axially de-linking said main drive shaft and said engine.

3. The module of claim 1 wherein said power transfer means comprises main drive and rotor transmission power input shaft mounted pulleys interconnected by endless belting means.

4. The module of claim 2 wherein said power transfer means comprises main drive and rotor transmission power input shaft mounted pulleys interconnected by endless belting means.

5. A VTOL aircraft comprising:

the module of any one of claims 1–4, a first elongated VTOL augmentation framework having a counter torque rotor mounted at an outer end for rotation in an axially aligned vertical plane and having an inner end connected to said component support framework other end of said module of any one of claims 1–4, a counter torque rotor drive shaft supported for axial rotation within said first VTOL augmentation framework with one end of said counter torque rotor drive shaft connected to said main drive shaft other end of said module of any one of claims 1–4 and said counter torque rotor drive shaft other end operatively connected to said counter torque rotor and an undercarriage with landing support attached to the underside of said component support framework of said module of any one of claims 1–4.

6. A compound VTOL aircraft comprising:

the module of any one of claims 1–4, a second elongated VTOL augmentation framework having a shrouded propeller mounted for rotation transversely of said second VTOL augmentation framework longitudinal axis forwardly of propeller slip stream deflecting means mounted at one end of said second VTOL augmentation framework and of which said framework other end is connected to said component support framework other end of said module of any one of claims 1–4, a shrouded propeller drive shaft supported for rotation within said second VTOL augmentation framework with one end of said shrouded propeller drive shaft connected to said main drive shaft other end of said module of any one of claims 1–4 and said shrouded propeller drive shaft other end operatively connected to said shrouded propeller, a pair of aerodynamic wing structures each having an inner root end with said root end of each said wing structures affixed to respective opposite sides of said component support framework of said module of any one of claims 1–4 to extend laterally outwardly therefrom and an undercarriage with landing support attached to the underside of said component support framework of said module of any one of claims 1–4.

7. A VTOL dual rotor aircraft comprising:

a pair of the module of any one of claims 1–4, a third elongated VTOL augmentation framework of which respective ends are attached to said component support framework other end of respective ones of said module pair of any one of claims 1–4, a connecting drive shaft supported for rotation by said third VTOL augmentation auxiliary framework to extend longitudinally thereof with respective ends of said connecting drive shaft operatively connected to said rotor transmission power input shaft outer ends of respective ones of said module pair of any one of claims 1–4 and an undercarriage with landing support attached to the underside of said component support framework of each said module pair of any one of claims 1–4.

8. A VTOL dual rotor aircraft comprising:

a pair of the module of any one of claims 1–4, a third elongated VTOL augmentation framework of which respective ends are attached to said component support framework other end of respective ones of said module pair of any one of claims 1–4, a connecting drive shaft supported for rotation by said third VTOL augmentation framework to extend longitudinally thereof with respective ends of said connecting drive shaft operatively connected to said main drive shaft other ends of respective ones of said module pair of any one of claims 1–4 and an undercarriage with landing support attached to the underside of said component support framework of each said module pair of any one of claims 1–4.

* * * * *